United States Patent
Choi

(10) Patent No.: US 7,475,332 B2
(45) Date of Patent: Jan. 6, 2009

(54) WIRELESS COMMUNICATION TERMINAL CAPABLE OF INFORMING VALID PLAYING TIME OF MULTIMEDIA DATA AND METHOD THEREOF

(75) Inventor: Yun-Ho Choi, Seongnam-si (KR)

(73) Assignee: Pantech Co., Ltd., Seoul (KR)

( * ) Notice: Subject to any disclaimer, the term of this patent is extended or adjusted under 35 U.S.C. 154(b) by 451 days.

(21) Appl. No.: 11/134,778

(22) Filed: May 19, 2005

(65) Prior Publication Data

US 2005/0289464 A1  Dec. 29, 2005

(30) Foreign Application Priority Data

May 20, 2004  (KR) ...................... 10-2004-0035851
Feb. 2, 2005  (KR) ...................... 10-2005-0009451

(51) Int. Cl.
*G06F 17/00* (2006.01)

(52) U.S. Cl. ...................... 715/201; 715/201

(58) Field of Classification Search ................ 715/723, 715/716, 500.1, 201, 202; 725/62, 63
See application file for complete search history.

(56) References Cited

U.S. PATENT DOCUMENTS

| | | | | |
|---|---|---|---|---|
| 6,038,545 A | * | 3/2000 | Mandeberg et al. | ............ 705/15 |
| 6,336,636 B1 | * | 1/2002 | Smart | ........................ 273/447 |
| 6,618,810 B1 | * | 9/2003 | Dirie | ........................... 726/27 |
| 6,961,896 B1 | * | 11/2005 | Rousselle et al. | ......... 715/500.1 |
| 6,993,283 B1 | * | 1/2006 | Ka Ming et al. | ........... 455/3.01 |
| 7,360,085 B2 | * | 4/2008 | Loveria, III | .................. 713/165 |
| 2002/0046084 A1 | * | 4/2002 | Steele et al. | ................... 705/14 |
| 2002/0152278 A1 | * | 10/2002 | Pontenzone et al. | ......... 709/217 |
| 2002/0181339 A1 | * | 12/2002 | Denda et al. | ............. 369/30.09 |
| 2002/0194356 A1 | * | 12/2002 | Chan et al. | ................... 709/231 |

(Continued)

FOREIGN PATENT DOCUMENTS

JP  2003-157335  5/2003

(Continued)

OTHER PUBLICATIONS

Roccetti et al., The Structuring of a Wireless Internet Application for a Music-on-demand Service on UMTS Devices, ACM 2002, pp. 1066-1073.*

(Continued)

*Primary Examiner*—Cong-Lac Huynh
(74) *Attorney, Agent, or Firm*—H.C. Park & Associates, PLC

(57) ABSTRACT

Provided are a wireless communication terminal having a function of informing a valid playing time of multimedia data, and a method thereof. The wireless communication terminal informs a user of a valid playing time of multimedia data by checking the valid playing time of the multimedia data periodically, when a user has multimedia data and valid playing time downloaded and stored in the wireless communication terminal. The method for informing a valid playing time of multimedia data in a wireless communication terminal includes the steps of: a) storing multimedia data and valid playing time of the multimedia data; b) checking the valid playing time of the multimedia data periodically; and c) outputting an alert signal if a remaining time of the valid playing time of the multimedia data is in a range of an alert time.

10 Claims, 3 Drawing Sheets

U.S. PATENT DOCUMENTS

| | | | |
|---|---|---|---|
| 2003/0016151 A1 | 1/2003 | Yamamoto et al. | |
| 2003/0032406 A1 | 2/2003 | Minear et al. | |
| 2004/0064840 A1* | 4/2004 | Liu | 725/153 |
| 2005/0102607 A1* | 5/2005 | Rousselle et al. | 715/501.1 |
| 2005/0251832 A1* | 11/2005 | Chiueh | 725/62 |
| 2005/0251848 A1* | 11/2005 | Al-Janabi | 725/135 |
| 2006/0155989 A1* | 7/2006 | Nishimoto et al. | 713/166 |
| 2007/0016865 A1* | 1/2007 | Johnson et al. | 715/716 |
| 2007/0030974 A1* | 2/2007 | Ishibashi et al. | 380/281 |

FOREIGN PATENT DOCUMENTS

KR  10-2004-0028086  4/2004

OTHER PUBLICATIONS

Schmandt et al., Impromptu: Managing Networked Audio Applications for Mobile Users, ACM 2004, pp. 59-69.*

Hesselman et al., A Mobility-aware Broadcasting Infrastructure for a Wireless Internet with Hotspots, ACM 2003, pp. 103-112.*

Liu et al., Digital Rights Management for Content Distribution, ACM 2003, pp. 1-10.*

* cited by examiner

WIRELESS COMMUNICATION TERMINAL CAPABLE OF INFORMING VALID PLAYING TIME OF MULTIMEDIA DATA AND METHOD THEREOF

FIELD OF THE INVENTION

The present invention relates to a wireless communication terminal having a function of informing a valid playing time of multimedia data and a method thereof; and, more particularly, to a wireless communication terminal that checks and informs a valid playing time of multimedia data periodically, compares the valid playing time of the multimedia data with the entire playing time when a signal for executing the multimedia data is inputted, and displays information on the comparison result or executes the multimedia data, and a method thereof.

DESCRIPTION OF RELATED ART

In the present specification, a wireless communication terminal means a portable terminal that can transmit and receive speech data, message data and image data through wireless communication. Examples of the wireless communication terminal include a mobile communication terminal, a personal communication service (PCS), a Personal Digital Assistant (PDA), a smart phone, a next-generation International Mobile Telecommunication 2000 (IMT-2000), and a wireless Local Area Network (LAN) terminal.

Hereinafter, the present invention will be described by taking a Moving Picture Experts Group (MPEG) Audio Layer 3 (MP3) as an example among diverse types of multimedia data, e.g., MP3, Windows Media Audio (WMA), Ogg vorbis (OGG) among many types of multimedia data.

A wireless communication terminal has many advantages. Among them all, the best advantage lies in mobility provided to users. The mobility is a major factor that has increased the number of wireless communication subscribers in a geometric progression. Recently, the wireless communication terminals are popularly used among general people.

As the number of wireless communication subscribers increases, more functions are called for to be added to a wireless communication terminal. To meet the demands, mobile phone equipped with a camera and a function of an MP3 player are brought into the market and getting a rave review among users.

In particular, a mobile phone with a function of an MP3 player, which is referred to as an MP3 phone, has advantages that users can download and listen to MP3 multimedia data directly from a multimedia data provider to the mobile phone after making a payment or the users download and listen to the MP3 multimedia data from their computers to the mobile phones.

However, since a considerable quantity of the MP3 multimedia data that the MP3 phone users have in their personal computers (PCs) are pirate files that are downloaded from an illegal web sites, a matter of copyright infringement emerges when the users move the pirate files into the MP3 phones and listen to them.

Therefore, suggested are methods that free MP3 files are provided and downloaded to the MP3 phones with a predetermined valid playing time through a conference among the music copyright institutions, mobile telecommunication companies, mobile terminal manufacturers and, after the valid playing time is expired, the MP3 multimedia data cannot be played any longer, even though the MP3 multimedia data are stored in the MP3 phones.

However, when the methods are used, it is impossible for a user to recognize all the valid playing times for all the MP3 multimedia data stored in the wireless communication terminal.

Therefore, there is a problem that the user having a great deal of MP3 multimedia data does not know the expiration date for every single MP3 multimedia datum and which of the MP3 multimedia data is expired and cannot be played.

SUMMARY OF THE INVENTION

It is, therefore, an object of the present invention to provide a wireless communication terminal having a function of informing a valid playing time of multimedia data by checking and informing the valid playing time of the multimedia data periodically, when a user has multimedia data including valid playing time downloaded and stored in his/her wireless communication terminal and multimedia data are played and listened to, and a method thereof.

It is another object of the present invention to provide a wireless communication terminal having a function of informing a valid playing time of multimedia data by checking the valid playing time of the multimedia data periodically upon an input of a multimedia data executing signal, comparing the valid playing time of the multimedia data with the entire playing time, and displaying an alert or executing the multimedia data according to the comparison result, when a user has multimedia data including valid playing time downloaded and stored in his/her wireless communication terminal and multimedia data are played, and a method thereof.

In accordance with an aspect of the present invention, there is provided a wireless communication terminal, which includes: an output unit for outputting an alert signal; a storage for storing multimedia data and valid playing time of the multimedia data; and a main processor for controlling the output unit to output the alert signal by checking a valid playing time of the multimedia data stored in the storage.

In accordance with another aspect of the present invention, there is provided a method for informing a valid playing time of multimedia data in a wireless communication terminal, which includes the steps of: a) storing multimedia data and valid playing time of the multimedia data; b) checking the valid playing time of the multimedia data periodically; and c) outputting an alert signal if a remaining time of the valid playing time of the multimedia data is in a range of an alert time.

In accordance with another aspect of the present invention, there is provided a 8.A wireless communication terminal, which includes: an input unit for receiving multimedia data executing signals; a storage for storing multimedia data, multimedia data information, which includes a file name, the title of the multimedia data, the name of a singer, and an entire playing time, and valid playing time of the multimedia data; a main processor for checking the valid playing time of the multimedia data stored in the storage upon receipt of a sound requesting to execute the multimedia data through the input unit, comparing the valid playing time of the multimedia data with the entire playing time, and outputting an alert informing that the execution of the multimedia data is rejected, executing the multimedia data while displaying the remaining time of the multimedia data, or executing the multimedia data according to the comparison result; a display unit for displaying the remaining time of the multimedia data or an alert informing that the execution of the multimedia data is rejected under the control of the main processor; and an output unit for outputting multimedia data signals executed under the control of the main processor.

In accordance with another aspect of the present invention, there is provided a method for informing a valid playing time in a wireless communication terminal, which includes the steps of: a) storing multimedia data and valid playing time of the multimedia data; b) receiving a signal for executing the multimedia data; c) determining whether the valid playing time of the multimedia data is expired; d) outputting an alert informing that the execution of the multimedia data is rejected, if the valid playing time of the multimedia data is expired; e) comparing a remaining time of the valid playing time of the multimedia data with the entire playing time of the multimedia data, if the valid playing time of the multimedia data is not expired; f) if the remaining time of the multimedia data is shorter than the entire playing time of the multimedia data, displaying the remaining time of the multimedia data and executing the multimedia data; and g) if the remaining time of the multimedia data is longer than the entire playing time of the multimedia data, executing the multimedia data.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter. In addition, if it is determined that detailed description on a prior art can blur the point of the present invention, it will be omitted.

Figure 1:
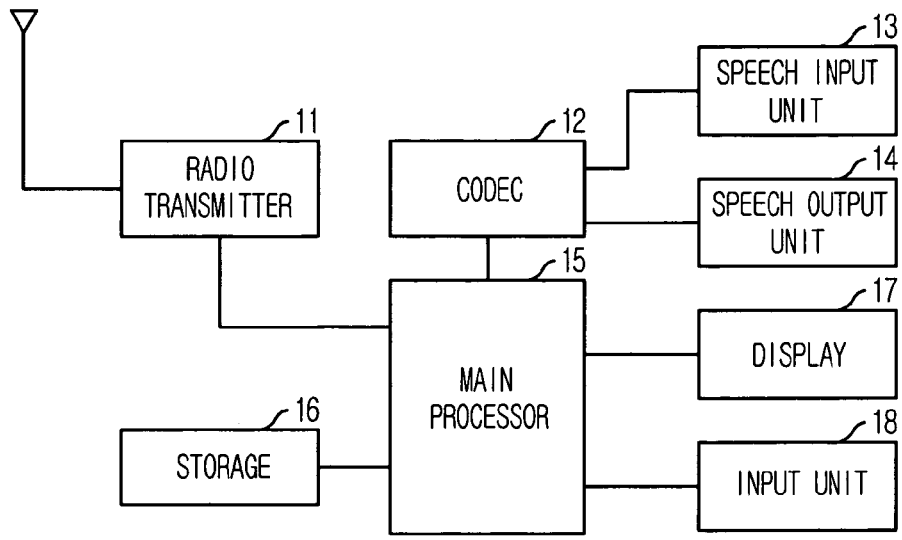
FIG. 1 is a block diagram illustrating a wireless communication terminal having a function of informing a valid playing time of multimedia data in accordance with an embodiment of the present invention.

FIG. 1 is a block diagram illustrating a wireless communication terminal having a function of informing a valid playing time of multimedia data in accordance with an embodiment of the present invention.

As shown, the wireless communication terminal having a function of informing a valid playing time of multimedia data comprises a radio transmitter 11, a codec 12, a speech input unit 13, a speech output unit 14, a storage 16, and a main processor 15. The radio transmitter 11 transmits and receives signals through an antenna wirelessly. The codec 12 converts the digital signals transmitted from the radio transmitter 11 into speech/sound signals, converts speech/sound signals inputted from the speech input unit 13 into digital signals and transmits them through the radio transmitter 11. The speech input unit 13 receives and transmits the speech/sound signals to the codec 12. The speech output unit 14 outputs speech/sound signals transmitted from the codec 12 and alert signals transmitted from the main processor 15 through the codec 12. The storage 16 stores MP3 multimedia data downloaded from multimedia data providers or personal computers (PCs) and valid playing time of the MP3 multimedia data. The main processor 15 checks out the valid playing time of the MP3 multimedia data stored in the storage 16 and controls components to output alert signals.

Herein, the storage 16 additionally stores information on the MP3 multimedia data, which will be referred to as multimedia data information hereinafter, such as a file name, the title of multimedia data and the name of a singer. The main processor 15 controls a display unit 17 or components such as the speech output unit 13 and a lamp (not shown) to output to display or output the multimedia data information, which includes a file name, the title of multimedia data and the name of a singer, valid playing time, and remaining time. Herein, the wireless communication terminal further comprises the display unit 17 to display the multimedia data information, such as a file name, a title of multimedia data and the name of a singer, valid playing time, and remaining time.

Meanwhile, the main processor 15 can control the display unit 17, the speech output unit 13 and the lamp to output the multimedia data information, e.g., a file name, a title of multimedia data and the name of a singer, valid playing time, and remaining time along with an alert signal by checking out the valid playing time of the MP3 multimedia data stored in the storage 16.

The operation of the wireless communication terminal will be described in detail with reference to FIG. 2 in accordance with an embodiment of the present invention.

In accordance with another embodiment of the present invention, the wireless communication terminal having a function of informing a valid playing time of multimedia data comprises a radio transmitter 11, a codec 12, a speech input unit 13, a speech output unit 14, a storage 16, a main processor 15, a display unit 17, and an input unit 18. The radio transmitter 11 transmits and receives signals through an antenna wirelessly. The codec 12 converts the digital signals transmitted from the radio transmitter 11 into speech/sound signals, converts speech/sound signals inputted from the speech input unit 13 into digital signals and transmits them through the radio transmitter 11. The speech input unit 13 receives and transmits the speech/sound signals to the codec 12. The speech output unit 14 outputs speech/sound signals transmitted from the codec 12 and multimedia data signals transmitted from the main processor 15 through the codec 12. The storage 16 stores at least one of MP3 multimedia data or multimedia data information, e.g., a file name, a title of the multimedia data, a name of the singer, and the entire playing time, and valid playing time of the MP3 multimedia data downloaded from multimedia data providers or PC. The main processor 15 checks out the valid playing time of the MP3 multimedia data stored in the storage 16, compares the valid playing time of the MP3 multimedia data with the entire playing time, and controls the components to output alert signals informing that execution of the MP3 multimedia data cannot be played, to execute the MP3 multimedia data while displaying the remaining time of the MP3 multimedia data (with or without the valid playing time), or to execute the MP3 multimedia data according to the comparison result. The display unit 17 displays the remaining time of the MP3 multimedia data (with or without the valid playing time) or display an alert for informing that a request for executing the MP3 multimedia data cannot be played. The input unit 18 receives signals for executing the MP3 multimedia data, information required by the wireless communication terminal having function keys and number keys.

The operation of the wireless communication terminal having a function of informing a valid playing time of MP3 multimedia data will be described in detail in accordance with another embodiment of the present invention.

Meanwhile, the codec 12 can be mounted on the main processor 15 and embodied in an integrated form.

Figure 2:
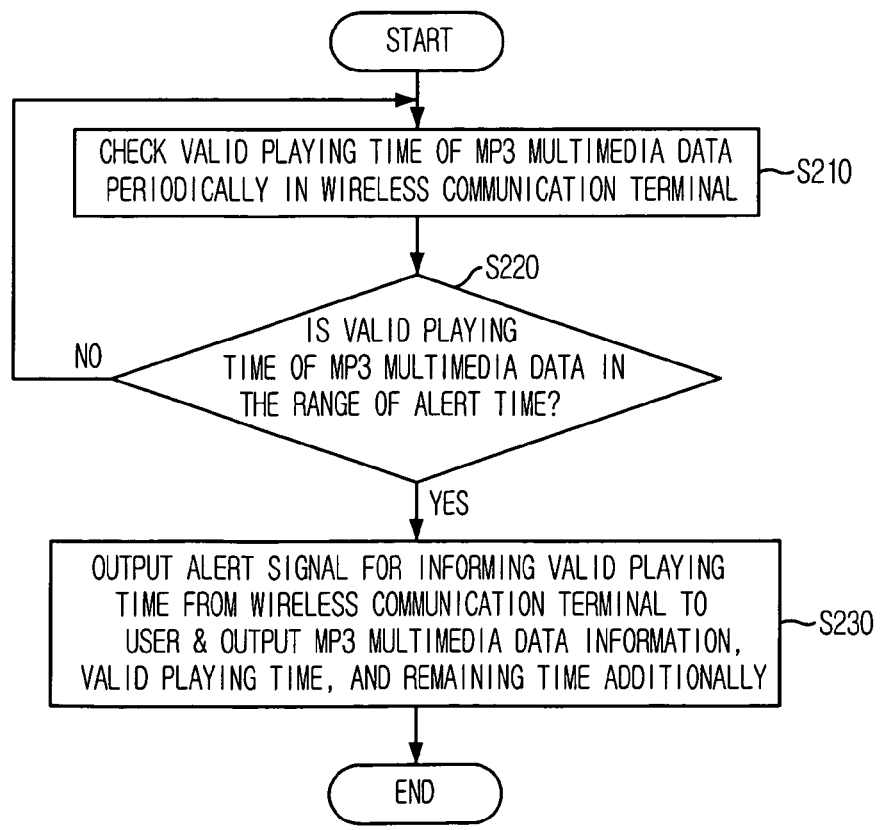
FIG. 2 is a flowchart describing a method for informing a valid playing time of multimedia data in a wireless communication terminal in accordance with an embodiment of the present invention.

FIG. 2 is a flowchart describing a method for informing a valid playing time of multimedia data in a wireless communication terminal in accordance with an embodiment of the present invention.

The storage 16 stores MP3 multimedia data and multimedia data information, the valid playing time of the MP3 multimedia data. The storage 16 may include one MP3 multimedia datum or a plurality of MP3 multimedia data. Also, it is possible to add multimedia data information to the multimedia data file.

Subsequently, at step S210, the valid playing time of the MP3 multimedia data in the storage 16 is checked up periodically by the main processor 15 of the wireless communication terminal.

Herein, the time can be a time interval established by a user or a time interval pre-established in the wireless communication terminal.

Subsequently, at step S220, it is determined whether the valid playing time of the MP3 multimedia data is in the range of alert time. The range of the alert time can be set up by the user to be a few days or a few hours before the expiration time of the multimedia data, or it can be time pre-set up in the wireless communication terminal. For example, if the user establishes the range of the alert time to be a day, i.e., 24 hours, before the valid playing time of the MP3 multimedia data is expired, the alert time range of an MP3 multimedia data whose valid playing time is 11:00, May 10, 2004, is from 11:00:01, May 9, 2004, to 11:00:00, May 10, 2004.

Figure 4A:
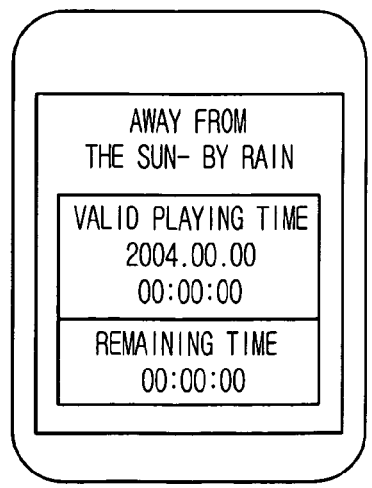
FIGS. 4A to 4C are diagrams presenting information on rejection to a request for executing multimedia data in connection with a valid playing time and a remaining time in accordance with an embodiment of the present invention.

If the valid playing time of the MP3 multimedia data is in the alert time range, at step S230, an alert signal is outputted from the speech output unit 14 to inform the user of the valid playing time in the wireless communication terminal. In addition, at the step S230, it is possible to display on the display unit 17 or output through the speech output unit 14 the multimedia data information, e.g., a file name, the title of the MP3 multimedia data and a name of a singer, the valid playing time, and the remaining time additionally after the alert signal is outputted, as described in FIGS. 4A.

It is also possible to display on the display unit 17 or output through the speech output unit 14 the multimedia data information, e.g., a file name, the title of the MP3 multimedia data and a name of a singer, the valid playing time, and the remaining time together with the alert signal by checking out the valid playing time of the MP3 multimedia data stored in the storage 16.

If the valid playing time of the MP3 multimedia data is out of the alert time range, the logic flow to the step S210 in which the valid playing time of the MP3 multimedia data is checked up again in a predetermined time. The subsequent processes are repeated as above, further description on them will not be provided herein.

Herein, the alert signal is outputted in the form of a signal sound, or in the form of the signal sound and lamp simultaneously to attract the user of the wireless communication terminal to check out the alert. However, the present invention is not limited to them.

Figure 3:
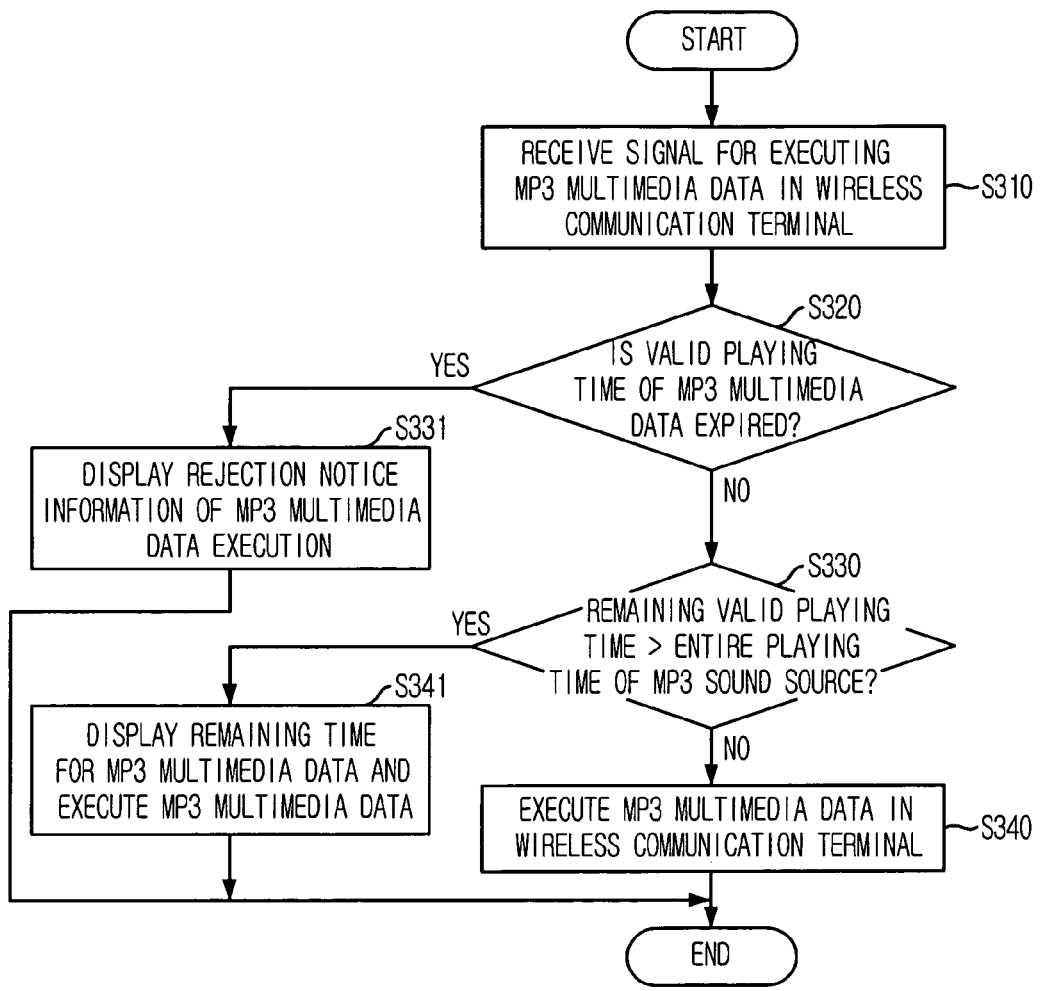
FIG. 3 is a flowchart describing a method for informing a valid playing time of multimedia data in a wireless communication terminal in accordance with another embodiment of the present invention.

FIG. 3 is a flowchart describing a method for informing a valid playing time of multimedia data in a wireless communication terminal in accordance with another embodiment of the present invention. The detailed structure of this embodiment is as described with reference to FIG. 2.

First, the storage 16 stores MP3 multimedia data, multimedia data information, which includes a file name, the title of multimedia data and the name of a singer, and the valid playing time of the MP3 multimedia data.

At step S310, a signal for executing the MP3 multimedia data is inputted from the input unit 18 to the main processor 15 of the wireless communication terminal.

Subsequently, at step S320, it is checked in the main processor 15 of the wireless communication terminal whether the valid playing time of the MP3 multimedia data is expired.

Figure 4B:

If it is determined at the step S320 that the valid playing time of the MP3 multimedia data is expired, as illustrated in FIG. 4B, at step S331, an alert information informing that the execution of the MP3 multimedia data cannot be played due to the expiration of the MP3 multimedia data. If it is determined at the step S320 that the valid playing time of the MP3 multimedia data is not expired, at step S330, the remaining time and the entire playing time of the MP3 multimedia data are compared.

Figure 4C:

If the remaining time is shorter than the entire playing time of the MP3 multimedia data at the step S330, at the step S341, the wireless communication terminal executes the MP3 multimedia data while displaying the remaining time, which is shown in FIG. 4C. If the remaining time is longer than the entire playing time of the MP3 multimedia data at the step S330, at the step S340, the wireless communication terminal executes the MP3 multimedia data.

Herein, the remaining time is a remaining valid playing time of the MP3 multimedia data and it is displayed in detail to the units of hour, minute, and second.

Also, the remaining time can be displayed with a time that is left, which is described in FIG. 4C. It can be displayed with both valid playing time and remaining time, which are presented in FIG. 4A.

The technology of the present invention can make a user to manage the MP3 multimedia data more efficiently by checking the valid playing time of the MP3 multimedia data periodically and informing the user of the expiration time of the valid playing time.

Also, when the user has multimedia data including the valid playing time downloaded and stored in the wireless communication terminal and listens to the multimedia data, the technology of the present invention improves the convenience on the user's part by checking the valid playing time of the multimedia data, comparing the valid playing time of the multimedia data with the entire playing time of the multimedia data upon receipt of a signal requesting to execute the multimedia data, and displays an alert and/or executes the multimedia data according to the comparison result.

The present application contains subject matter related to Korean patent application Nos. 2004-0035851 and 2005-0009451, filed with the Korean Intellectual Property Office on May 20, 2004, and Feb. 2, 2005, respectively, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A wireless communication terminal, comprising:
   an output unit for outputting an alert signal;
   a storage for storing multimedia data and information for a valid playing time of the multimedia data; and
   a main processor for checking a remaining time of the valid playing time of the multimedia data periodically and controlling the output unit to output the alert signal when the remaining time of the valid playing time is within a predetermined range of an alert time.

2. The wireless communication terminal as recited in claim 1, further includes a display unit for displaying multimedia data information stored in the storage, the valid playing time, and the remaining time under control of the main processor.

3. The wireless communication terminal as recited in claim 2, wherein the multimedia data information includes at least one of a file name, a title of the multimedia data, and a name of a singer.

4. The wireless communication terminal as recited in claim 1,
wherein the output unit is configured to outputs multimedia data information stored in the storage, the valid playing time, and the remaining time in a form of speech under the control of the main processor.

5. The wireless communication terminal as recited in claim 1, wherein the main processor is configured to controls the output unit to output the multimedia data information, the valid playing time, and the remaining time along with the alert signal when the remaining time of the valid playing time is within a predetermined range of alert time.

6. A wireless communication terminal, comprising:
an input unit for receiving multimedia data executing signals;
a storage for storing multimedia data, multimedia data information, an entire playing time, and valid playing time of the multimedia data;
a main processor for comparing a remaining time of the valid playing time of the multimedia data with the entire playing time of the multimedia data stored in the storage upon receipt of the multimedia data executing signals;
a display unit for displaying the remaining time of the valid playing time of the multimedia data under the control of the main processor; and
an output unit for outputting multimedia data signals executed under the control of the main processor,
wherein the main processor is configured to control the display unit to display the remaining time of the multimedia data and further configured to control the execution of the multimedia data, if the remaining time of the valid playing time of the multimedia data is shorter than the entire playing time of the multimedia data,
wherein the main processor is configured to control the execution of the multimedia data, if the remaining time of the valid playing time of the multimedia data is longer than the entire playing time of the multimedia data;
wherein the main processor is configured to control the display unit to display the valid playing time of the multimedia data during the remaining time.

7. A method for informing a valid playing time of multimedia data in a wireless communication terminal, the method comprising:
a) storing multimedia data and information for a valid playing time of the multimedia data;
b) checking a remaining time of the valid playing time of the multimedia data periodically; and
c) outputting an alert signal if the remaining time of the valid playing time of the multimedia data is within a predetermined range of an alert time.

8. The method as recited in claim 7, wherein at least one of multimedia data information stored in the storage, the valid playing time, and the remaining time are outputted together with the alert signal.

9. The method as recited in claim 8, wherein the alert time range is established in the main processor of the wireless communication terminal according to a selection of a user.

10. A method for informing a valid playing time in a wireless communication terminal, the method comprising:
a) storing multimedia data and valid playing time of the multimedia data;
b) receiving a signal for executing the multimedia data;
c) determining whether the valid playing time of the multimedia data is expired;
d) outputting an alert informing that the execution of the multimedia data is rejected, if the valid playing time of the multimedia data is expired;
e) comparing a remaining time of the valid playing time of the multimedia data with the entire playing time of the multimedia data, if the valid playing time of the multimedia data is not expired;
f) if the remaining time of the valid playing time of the multimedia data is shorter than the entire playing time of the multimedia data, displaying the remaining time of the valid playing time of the multimedia data and executing the multimedia data during the remaining time; and
g) if the remaining time of the valid playing time of the multimedia data is longer than the entire playing time of the multimedia data, executing the multimedia data.

* * * * *